ated Feb. 12, 1974

United States Patent
Moyer et al.

[54] RAPID METHODS FOR ASSAY OF ENZYME SUBSTRATES AND METABOLITES

[75] Inventors: Rudolph H. Moyer, W. Covina; Donald J. Sibbett, Cucamonga, both of Calif.

[73] Assignee: Geomet, Incorporated, Rockville, Md.

[ * ] Notice: The portion of the term of this patent subsequent to Apr. 16, 1989, has been disclaimed.

[22] Filed: Feb. 25, 1971

[21] Appl. No.: 118,903

[52] U.S. Cl........ 195/127, 195/103.5 R, 23/253 TP
[51] Int. Cl............................................. C12k 31/14
[58] Field of Search... 195/103.5 R, 127; 23/253 TP

[56] References Cited
UNITED STATES PATENTS

| | | | |
|---|---|---|---|
| 3,526,480 | 9/1970 | Findl et al..................... | 195/103.5 R |
| 3,367,841 | 2/1968 | Buissiere et al.............. | 195/103.5 R |
| 3,663,374 | 5/1972 | Moyer et al.................. | 195/103.5 R |

*Primary Examiner*—Alvin E. Tanenholtz
*Assistant Examiner*—Max D. Hensley

[57] ABSTRACT

Method and apparatus for quantitating the amounts of enzyme substrates and metabolites present in biological fluids using spot test techniques. The tests utilize both fixed, preselected color standards and substrate and metabolite standards freeze-dried on transparent membranes or in porous pads for comparison. Other reagents including enzymes, dyes, cofactors are also freeze-dried in absorbent pads. The assembly may utilize any or all of the following in various combinations: porous discs of materials such as glass fibre filters to store reagents, to serve as liquid reaction volume measurement, and to assist in removing cells from blood samples; microporous membranes to act as barriers to blood cells; a protein enrichment membrane or a dialysis membrane to restrict passage of large molecules to the indicator zone; and a transparent window which may be a second microporous membrane or impermeable plastic on which indicator dyes are dried. In assembled format, the test plates, slides or discs fulfill all requirements for conducting the selected test: no added instrumentation, controls or other measurements are required.

These test devices may assist in the diagnosis of a number of pathological conditions which give rise to abnormal levels of metabolites or enzyme substrates. Methods for rapid assay of serum cholestrol, uric acid, testosterone, androsterone and galactose have been indicated as examples. A wide variety of other compounds found in biological fluids may also be assayed by similar technology.

11 Claims, 9 Drawing Figures

INVENTORS
RUDOLPH H. MOYER
DONALD J. SIBBETT

BY David H. Semmes

ATTORNEYS

PATENTED FEB 12 1974　3,791,933

INVENTORS
RUDOLPH H. MOYER
DONALD J. SIBBETT

BY David H. Semmes

ATTORNEY

RAPID METHODS FOR ASSAY OF ENZYME SUBSTRATES AND METABOLITES

The present invention relates to extensions and improvements of the concepts and principles disclosed in our copending applications, Ser. No. 63,842, entitled "Method and Apparatus for Quantitating Enzyme Activity now U.S. Pat. No. 3,663,374," filed Aug. 14, 1970, and Ser. No. 110,185, entitled "Improved Methods and Apparatus for Assaying Enzyme Activity," filed Jan. 27, 1971.

BACKGROUND OF THE INVENTION

The human body is composed of many different organs and several different types of tissues with characteristic functions. Most of these tissues contain relatively large amounts of secondary specialized materials necessitated by the nature and function of the tissue. Examples of these specialized compounds include:
1. phospholipids, cholesterol and glycolipids in brain and nerve tissue,
2. glycogen in liver,
3. hemoglobin in red blood cells,
4. hormones in endocrine glands,
5. myosin in muscle, etc.

Both the state of nutrition or pathological conditions markedly influence the composition of the body tissues. Such variations are frequently reflected in the composition of the body fluids, particularly blood, which forms the basis for much of modern clinical diagnosis. A few examples of typical metabolic compounds of interest and diseases associated with them are found in the following table:

| COMPOUND | COMPOSITION CHANGE AND DISEASE |
|---|---|
| Acetone (urine) | Increased in diabetes mellitus, starvation, von Gierke's disease, eclampsia, selected nervous disorders, etc. |
| Ascorbic Acid (blood and urine) | Increased after ether anesthesia; Decreased in scurvy. |
| Albumin | Increased by dehydration; Decreased in chronic hepatitis, hepatic cirrhosis, anemias, many diseases. |
| Bilirubin (blood) | Increased in acute hepatitis, various jaundices, selected anemias, acute yellow atrophy, malaria hemolytic septicemia, incompatible bloood transfusions, etc. |
| Catechol amines | Increased in pheochromatoma, extra medullary chromaffin tumors. |
| Cholesterol | Increased levels in arteriolar sclerosis, pancreatitis, diabetes mellitus, nephrotic syndrone, hypophysectomy, multiple sclerosis, leukemia, eclampsia, etc.; Decreased levels in anemia, acute infections, hyperthroidism, epilepsy and hepatic diseases. |
| Creatine | Increased in muscular dystrophy, myastenia gravis, hepatic carcinoma, diabetes. |
| Creatinine | Increased in diabetes, pneumonia, nephritis, urinary obstructions, intestinal obstructions, tetany; Decreased in amyotonia congenita, anemia, leukemia, advanced nephritis muscular atrophy. |
| Galactose | Increased in galactosemia, some liver diseases. |
| Glucose | Increased in diabetes mellitus, hyperpituitarism, coronary thrombosis, increased intercranial pressure, shock, infarctions, hyperthyroidism, chronic nephritis, urinary obstructions; Decreased values in hyperinsulinism, hepatic insufficiency, pancreatic adenoma, Addison's disease, hypothyroidism, etc. |
| Lactic Acid (gastric) | Present with gastric carcinoma, chronic gastritis, dilatation of the stomach, pyloric obstruction, etc. |
| Pyruvic Acid (blood) | Increased in vitamin B and thiamine insufficiency, fever, carcinoma, cirrhosis of the liver, von Gierke's disease, hyperthyroidism, cardiac decompensation. |
| Urea Nitrogen | Increased in renal impairment, intestinal obstruction, dehydration, pneumonia, bleeding peptic and duodenal ulcers, etc; Decreased in acute hepatic insufficiency, nephrosis, chronic wasting diseases, amyloidosis, pregnancy. |
| Uric Acid | Increased in various renal insufficiency diseases: acute and chronic nephritis, urinary obstructions, metallic poisoning such as by mercury and lead, hypertension; metabolic disturbances: gout, diabetes with acidosis: after exercise, rapid destruction of cell nuclei: leukemia, polycythemia, malignant tumors, pernicious anemia, etc; Decreased in pernicious anemia (relapse), acute yellow atrophy of the liver, salicylate and atophan therapy. |

Assays of metabolites and/or enzyme substrates in body fluids have been used for a considerable period as an important aid in diagnosis of pathological conditions in humans. Rapid assays of most of these compounds have not been possible, particularly without instrumentation and trained personnel. Utilization of modifications of the techniques described in the aforesaid copending applications for patents makes available rapid and simple tests for many of these indicators of physiological disorders.

SUMMARY OF THE INVENTION

The methods and apparatus utilize simple but selective spot test procedures for assay of components of the blood, urine, spinal fluid, etc. For measurements which involve inhibition of enzyme reactions, indicator color development on test spots is compared to color development on reference spots. In such cases, reference spots contain standardized amounts of enzymes and/or inhibitory agents. For substrates or metabolites in biological fluids where measurement or assay is dependent only on conversion of the compounds of interest, direct comparison between the color developed on the test spot and a color chart calibrated in terms of concentration may be utilized.

Illustrative embodiments of apparatus and working embodiments of practical methods of the invention will be explained with reference to the accompanying drawings in which.

Figure 1:
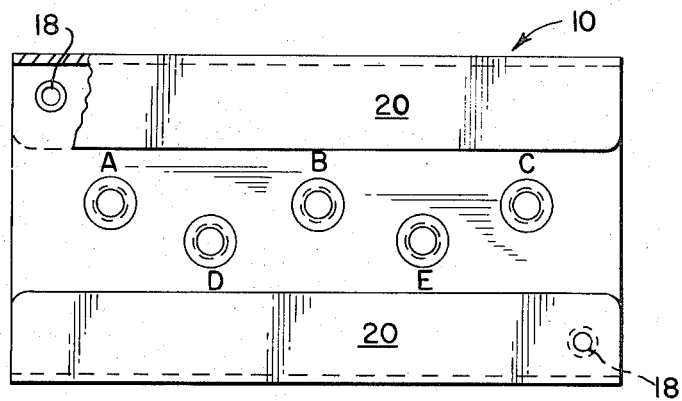
FIG. 1 is a plan view of a format suitable for comparison between rate of color development on standard spots and on a test spot.

Referring now in more detail to the drawings, the format of FIG. 1 is designed for the type of analysis which requires comparison between the rate of color development on standard spots and that on a test spot. This arrangement is particularly appropriate for analysis involving enzyme reaction inhibition such as exemplified by a cholesterol assay such as indicated hereinafter. The test plate is generally designated 10 and includes thereon a plurality of test spot areas A, B, C, D and E. Spots A, B, and C contain standards, as will appear hereinafter, representing normal, elevated and very high enzyme levels respectively. Spot D is a blank and spot E is for assay of the test specimen and contains all reagents. A reordering of spots can be appropriate as desired.

Figures 2, 3:
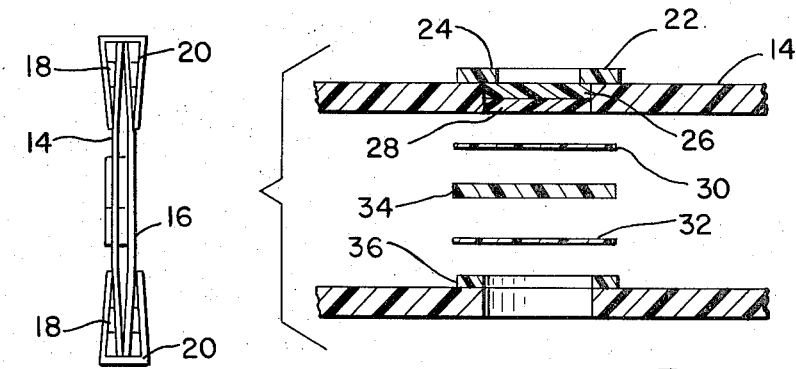
FIG. 2 is an end elevational view of the structure of FIG. 1.
FIG. 3 is a fragmentary exploded view of a stacked or assembled array of the components of a test spot of FIG. 1.

The test plate 10 consists of two slides, 14, 16 of appropriate dimensions and preferably are of high impact, opaque polystyrene sheets. The sheets or slides, as assembled, are fastened by corner eyelets 18 and plastic spring clamps 20 are used to cover the edges of the assembly. The spring clamps maintain effective seals between various of the components, such as the retaining rings and absorbent glass fibre discs on which required reagents are impregnated. The spot test format components and arrangement are shown in FIG. 3. Item 22 is a high-impact, circular polystyrene retaining ring of one-fourth inch diameter with a one-eighth inch hole in its center. This ring which may be made from clear plastic of 0.015 inch thickness is sealed to the upper side of an opaque, white, high-impact polystyrene slide 14 measuring 1 ⅝ inches × 3 ¼ inches. A 0.161 inch diameter hole 24 in the upper slide 14 is filled with two discs of glass fibre padding (Whatman GF/A glass fiber paper has been successfully used,) which are designated as Items 26 and 28. These absorbent discs are retained in the hole during preparation of the assembly by sealing membranes 30 such as microporous filters onto the bottom side of the upper slide. For assay of metabolites and substrates, materials such as Metricel P.E.M. (average pore diameter 0.0075 microns), Acropor AN and Ion Exchange Acropor, all marketed by the Gelman Instrument Company (Ann Arbor, Michigan), have been found useful and appropriate. Metricel PEM is used to concentrate protein molecules on the upper side of the barrier. Acropor AN, may be used to filter out blood platelets and cells. Acropor Ion-Exchange filters may be used to remove interfering anions and cations from contact with the dyes which are deposited on the upper surface of a window 32. Another absorbent disc 34 is placed between the membrane 30 and the window 32. Its function is to assist in drawing liquid through the membrane 30, to serve as reaction volume, as do discs 26 and 28, and to distribute the reacting liquid mixture uniformly across the viewing window 32. The viewing window 32 may be utilized as the reservoir for indicator dyes and enzymes. These are deposited in solution and freeze-dried on its upper surface. When the liquid reaction mixture diffuses through the assembly associated with the upper slide, color is developed at the interface between Items 34 and 32. The bottom slide may be sealed to another ring 36 such as the upper retainer 22. The window, 32 may be either a clear impermeable plastic or a transparent film such as Nuclepore (General Electric Co.) sealed across the lower ring 36. By use of the permeable film, it has been found possible to avoid the formation of bubbles at the interface between members 34 and 32. Bubbles in this position may make color development uneven and difficult to accurately compare. The lower ring and the plactic spring edge binders and corner eyelets 18 serve to maintain the integrity of the liquid seal in all parts of each single spot assembly. The two plates are sealed together in a dry atmosphere (< 10 percent relative humidity) and stored in gas tight envelopes.

Figures 4, 5:
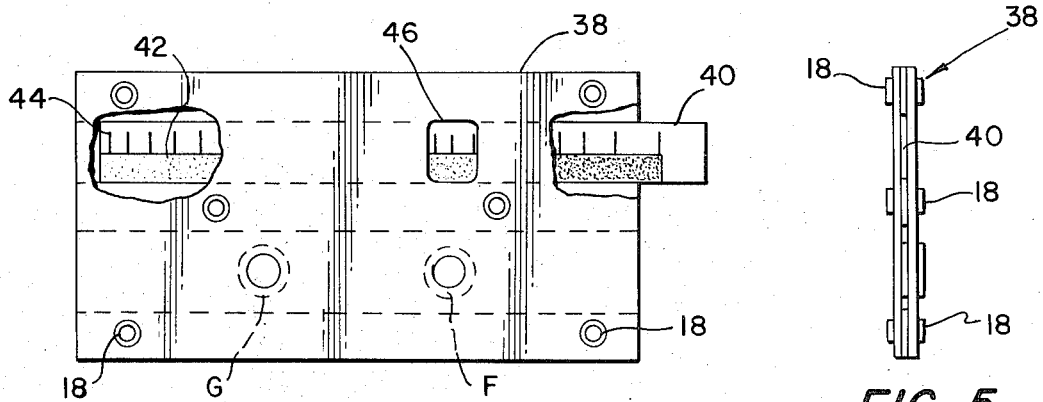
FIG. 4 is a plan view, a portion being broken away for clarity, of a format for determining final color development indicative of progress of the substrate-limited process employed as a basis for analysis.
FIG. 5 is an end elevational view of the embodiment of FIG. 4.

Another example of a test plate format which may be utilized where the rate of color development is not of concern, is shown in FIG. 4. This type of test plate is employed effectively for most determinations of metabolites and enzyme substrates. In such determinations complete conversion of the metabolite by enzymes is usually involved. The final color development is indicative of the progress of the substrate-limited process which has been employed as the basis for analysis. This embodiment includes a test plate 38 which is similar in size and construction materials to that in FIG. 38. However, only spot sites for the actual test F and blank G are required. The test spots are assembled as shown in FIG. 3. A color slide 40 which is calibrated in terms of metabolite concentrations corresponding to equilibrium development of color is operatively engaged with plate 30. The shaded portion 42 represents the colored section. It is graduated in terms of the chromogen utilized. For example, for analyses in which the nitro blue tetrazoleum is used, the color slide varies from white to dark blue. The read-out side 44 of the color slide is calibrated in terms of the concentration of the metabolite. For the uric acid determination indicated below brown colors corresponding to normal values (2–6 mg percent in serum) have been placed in the center of the slide. Darker brown colors (0-dianisidine is the chromogen in this determination) on the right hand side are indicative of uric acid concentrations above the normal range. Lighter browns on the left hand side of the slide correspond to the color developed by sub-normal uric acid levels. Serum concentrations which correspond to these levels have been indicated on the upper section of the color slide. A logarithmic scale has been utilized.

In practice, the determination is made as follows:
1. Liquid samples are placed on the bottom of the slide, (Item 22 in FIG. 1).
2. The slide is inverted as color development progresses.
3. At approximately 5 minutes after step 1, the color on the test side is matched with that on the color slide by moving the slide until the best possible color match is achieved in the center of window 46.

The analysis is achieved by reading off the numerical value of the metabolite concentration opposite the index mark at the center of the window. The units of the concentrations are printed on the right hand end of the slide. Comparison of the color match at later reaction times may be used to confirm the analysis.

Figure 6:
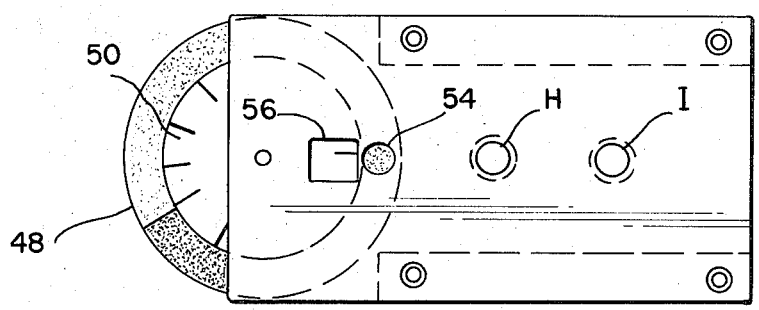
FIG. 6 is a plan view showing a format similar to that of FIG. 4 but disclosing a different form of readout means.
Figures 7, 9:
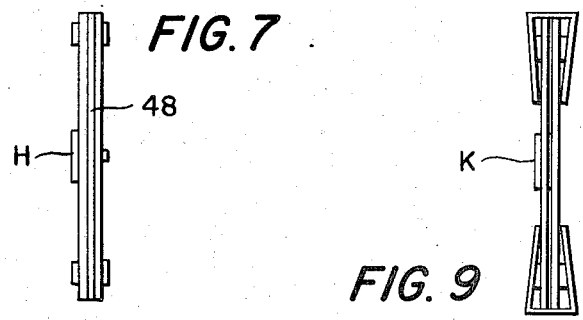
FIG. 7 is an end elevational view of the embodiment of FIG. 6.
FIG. 9 is an end elevational view of the embodiment of FIG. 8.

The test format shown in FIG. 6 is similar to that in FIG. 4. However, a rotating color wheel 48 has been employed in the place of the slide. Measurements are achieved by rotation of the wheel and read out on the inner numerical scale 50 opposite the index. In FIG. 6 the indicated items are as follows:

Item H is the site utilized for sample testing;
Item I is the blank;
Item 52 is the colored portion of the wheel 48 which varies from colorless (white) to a color corresponding to excessively high values of the assayed metabolite;
Item 54 is the window used to isolate a portion of the color wheel corresponding to a match with the test site, H;
Item 50 shows the scale calibrations in terms of metabolite concentrations; and
Index 56 indicates the metabolite concentration corresponding to the matched color.

Another form of the comparator may utilize a fixed color strip and calibration printed on the surface of the test plate. However, since the eye views all densities of the chromogen color simultaneously, the accuracy of the assay is decreased. Such a method is shown in FIG. 8.

Figure 8:
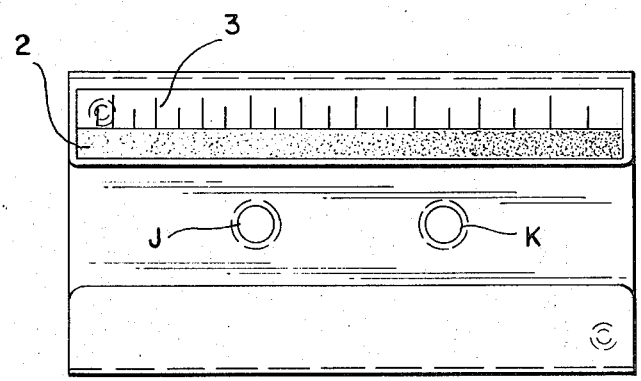
FIG. 8 is a plan view of a further format adapted for use with fixed color standards incorporating an immobile color index.

In FIG. 8, the blank and test sites are shown at J and K. The color scale, 58, varies from colorless to excessively intense for the chromogen and assay of interest. Concentration scale 60 corresponds to the color levels on 58.

A number of examples are indicated below to show the application of these techniques.

EXAMPLE 1: BLOOD URIC ACID

Variation of uric acid in the blood from the normal range of 2.0 to 5.0 mg percent accompanies a wide range of metabolic, blood, renal and liver diseases.

Analysis utilized the following method: In the presence of the enzyme uricase, uric acid is convertible to allantoin and hydrogen peroxide. The formation of hydrogen peroxide may be detected by the oxidation of a number of chromogens in the presence of peroxidase. Methods utilizing this technique have been examined by P. Howorth, and J. Zilva, J. Clin. Path., 21, 192 (1968); G. Domagk and H. Schilicke, Anal. Biochem. 22, 219 (1968), and C. Nordschow, Anal. Biochem. 31, 6 (1969). Schematically, the reactions involved are:

Uric Acid + $H_2O \longrightarrow$ Allantoin + $H_2O_2$ + $CO_2$

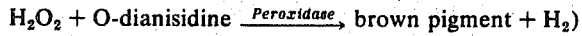
$H_2O_2$ + O-dianisidine $\xrightarrow{Peroxidase}$ brown pigment + $H_2$)

where O-dianisidine is the chromogenic election donor. Dyes such as 2,6-dichlorophenol-indophenol may also be employed.

Procedures and reagents utilized to impregnate the absorbent glass fiber pads of the test and blank spot which are assembled in a configuration such as indicated in FIG. 3 are:

1. For use with whole blood samples, glass fiber pads 26, 28, were (a) washed with glacial acetic acid, (b) washed with glass distilled water, (c) dried, (d) saturated with 20 µl of a solution of bovine serum albumin containing 10 mg/ml and (e) dried under vacuum in a desiccator.
2. Glycine - borate buffer: 5.0g glycine, 3.81g sodium tetraborate and 42mg disodium salt of ethylene diamine tetracetic acid were dissolved in 80 cc of water. The pH was adjusted to 8.50 by the addition of 2N hydrochloric acid. The solution was made up to 100 ml and used as the buffering solution.
3. Uricase: Worthington uricase powder was dissolved in 0.5 ml of 1/10 diluted buffer so as to have approximately 1 IU/ml. Pads 26 and 28 were saturated with 20µl and freeze-dried.
4. O-Dianisidine Hydrochloride-Peroxidase Mixture: A solution containing 3.5 mg of O-dianisidine hydrochloride (recrystallized) and 0.1 mg horseradish peroxidase in 2.5 ml was utilized to deposit the chromogen on the viewing surface 32. The solution also contained 3.0 mg/ml dextran (Dextran, Clinical, Nutrional Biochemicals Corp.). A volume of 5µl was freeze-dried on the transparent Nuclepore membrane which was sealed to the ring 36.

In this analysis use of the GELMAN PEM filter as member 30 is appropriate. Readout utilizes the plate format shown in FIGS. 4, 6, or 8.

EXAMPLE 2: TESTOSTERONE AND ANDROSTERONE

Low levels of the male sex hormones may be involved in or indicative of disorders such as adrenal insufficiency, hypogonadism, hypopituitarism, osteoporosis and refractory anemia. High levels may be indicative of adrenal hyperactivity or ovarian tumor. In the adult male, blood levels of testosterone are of the order of 0.5µg percent. Urine samples may also be used for assay.

Testosterone and androsterone may be determined by utilizing the same procedure but with different enzyme reagents. The determination of testosterone may be carried out with Worthington Hydroxysteroid Dehydrogenase (Code: STDH); androsterone requires Worthington Hydroxysteroid Dehydrogenase (mutant) (Code: STDHM), The method utilized depends upon the formation of reduced nicotinamideadenine dinucleotide (NAD.H) from the reaction of the hormone with the appropriate enzyme. The product NAD.H may be used to develop the color of nitro blue formazan from nitro blue tetrazoleum (NBT) utilizing N-methyl phenazonium methosulfact (PMS) as an electron carrier. Schematically the method for testosterone consists of the following:

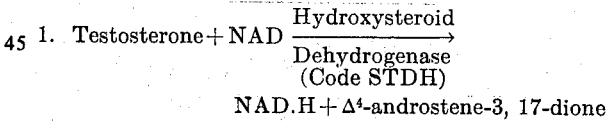
1. Testosterone + NAD $\xrightarrow[\text{Dehydrogenase}]{\text{Hydroxysteroid}}$ (Code STDH)

NAD.H + $\Delta^4$-androstene-3, 17-dione where NAD is nicotinanide adenine dinucleotide.

2. NAD.H + PMS $\longrightarrow$ NAD + PMS.H
PMS is N-methyl penazonium methosulfate.
3. PMS.H + NBT $\longrightarrow$ PMS + Nitro blue formazan (dark blue)

PMS.H is the reduced form of PMS.

The initial step has been described by H. Carstensen Nature 212, 1604–5 (1966). Detection of NADH by the reaction with PMS and nitro blue tetrazoleum has been described by these inventors in previous biochemical spot tests.

An indicated in Example 1, the glass fiber pads 26, 28 and 34 were pretreated with purified human serum albumin. After drying they were impregnated with 30µl of the following solution made up in 0.03 molar pyrophosphate buffer (pH = 8.8):

| REAGENTS | CONCENTRATIONS (mg/ml) |
|---|---|
| Nicotinamide adenine dinucleotide (NAD) | 0.8–1.2 |

| REAGENTS | CONCENTRATIONS (mg/ml) |
|---|---|
| Hydroxysteroid Dehydrogenase | 50–200 Talahay units* |
| N-Methly phenazonium metho sulfate | 0.04–0.08 |

* Marcus, P I. and Talahay, P., J. Biol. Chem. 218, 661 (1956)

The transparent layer 32 was impregnated with 5 l of:

| REAGENTS | CONCENTRATIONS (mg/ml) |
|---|---|
| Nitro Blue tetrazoleum | 0.8–1.6 |
| Dextran(Dextran, Clinical 200,000–300,000, Nutritional Biochemicals Corp.) | 3.0 |

The plate format of FIGS. 5 and 6 are most appropriate. After addition of blood samples to the upper side of the test plate, the reaction is allowed to proceed for approximately 5 minutes at room temperature. Development of the blue color is compared with the colors on the color slide for estimation of the assay. Color development may be compared again at 10–15 minutes for a check on the completeness of the reaction.

EXAMPLE 3: GALACTOSE

Galactosemia is a disorder of galactose metabolism which if untreated results in cirrhosis of the liver, blindness and mental retardation. It is caused by the absence of galactose-1-phosphate uridyl transferase, an occasional hereditary defect. Liver damage may also give rise to increased levels of galactose in the urine and blood. Under normal conditions, galactose is absorbed rapidly from the intestines and blood and urine levels are negligible. The assay may also be utilized to test carbohydrate metabolism following galactose ingestion.

The schematic procedure with blood samples which has been indicated by H. Roth, S. Segal and D. Bertoldi, Anal. Biochem., 10, 32 (1965) and J. M. Sempere, C. Gancedo and C. Asensio, Anal. Biochem., 12, 509 (1965) is as follows:

1. D-galactose + $O_2$ 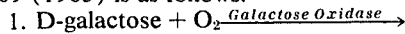 D-galacto-hexodialdose + $H_2O_2$
2. $H_2O_2$ + O-dianisidine 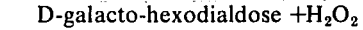 brown pigment + $H_2O$ As indicated in Example 1, above, the glass fiber pads are coated with human serum albumin. The pads 26, 28, and 34, are impregnated with 30µl of the following reagent solution made up in 0.01M phosphate buffer (pH = 7.0):

| REAGENT | CONCENTRATION (mg/ml) |
|---|---|
| Galactose Oxidase (Worthington, Code GAO) | Approximately 0.02 |

The pads were freeze-dried as indicated in the preceeding discussion.

The peroxidase-O-dianisidine reagent is freeze-dried on the window or transparent membrane 32 utilizing a volume of 5µl. The indicator solution is comprised of the following reagents in 0.01M phosphate buffer (pH = 7.0):

| REAGENT | CONCENTRATION (mg/ml) |
|---|---|
| O-dianisidine (Recrystallized) | 0.2 |
| Peroxidase (Worthington, Peroxidase D, Code HPOD) | approximately 0.1 |
| Dextran (Dextran, Nutritional Biochemicals Corporation) | 3.0 |

Assembly and storage techniques are indicated above.

EXAMPLE 4: CHOLESTEROL

Abnormal cholesterol levels in the blood may be used to indicate many disorders involving lipid metabolism. (Table 1 indicates a selection of such diseases). Normal values of serum cholesterol vary between 180–260 mg percent for women and 150–250 mg percent for men.

Rapid assay of serum cholesterol may be achieved utilizing the spot test format of this invention in conjunction with the relatively specific inhibition of the enzyme β-glucuronidase by cholesterol. This reaction has been studied by A. L. Tappel and C. J. Dillard, J. Biol. Chem. 242, 2463–69 (1967). The methods utilized involved measurement of the amount of phenolphthalein released during the hydrolysis of phenolphthalein glucuronide by β-glucuronidase.

1. Phenolpthalein glucuronide + $H_2$) ⟶ phenolphthalein + D-glucuronic acid
2. Phenolpthalein + base ⟶ pink-red color (anion)

The cholesterol screening assay utilized the format indicated in FIG. 1. In its preparation, the absorbent glass fiber pads are treated with serum albumin as previously described. The two upper pads 26 and 28 are impregnated with 0.20µl of an enzyme solution containing 2.0–6.0 mg of β-glucuronidase (Worthington, Bovine Liver, Code GL) in 0.1M acetate buffer (pH = 4.5). The upper assembly is then freeze-dried. The glass fiber pad below the membrane filter 30 is impregnated with a substrate solution containing 8mg/ml of phenolphthalein glucuronide (Sigma) in 0.1M acetate buffer. This pad is freeze-dried separately.

Two methods may be utilized for obtaining the anionic red color from the released phenolphthalein:

1. A transparent membrane 32 may be utilized which is moistened after an appropriate reaction interval (5–10 minutes) with a basic solution such a 0.2M glycine buffer (pH = 10.4), or,
2. A thin layer of a precipitated base such as calcium carbonate containing 0.2 M sodium chloride and dextran (3 mg/ml) may be dried on the inside of the transparent nonporous surface of the viewing window.

A volume of 5–10µl has been sufficient for creation of this layer.

The pink-red color obtained at the test site E must be compared against the color development at any time on sites A, B, and C. Site A contains approximately 80 mg percent of cholesterol, combined on the upper pads together with the enzyme. Site B contains approximately 230 mg percent of cholesterol in the same pad position, Site C contains approximately 400 mg percent. Sites A, B, and C are moistened with a serum albumin solution (10 mg/ml) at the start of the assay. The blank site, Site D contains no substrate, phenolphthalein glucuronide. A blood sample is placed on both Sites D and E for analysis.

This screening system develops higher levels of color for low levels of cholesterol. Since an excess of the substrate and enzyme are present, the rate of development of the color must be compared in order to estimate the assay. Thus, at 5 and 10 minutes after the start of the test, the pink red color of the test site should be compared with the standards. Eventually the three standards and the test site will show the same color development.

Other metabolites and substrates which may be determined utilizing similar procedures modified to accomodate spot techniques are: acetone, albumin, ascorbic acid, bilirubin, carotene, creatinine, creatine, glucose, pyruvic acid, urea nitrogen, porphyrin, cystine, hippuric acid, lactic acid, lactose, melanin, and pentose.

Manifestily minor changes and minor variations can be effected without departing from the spirit and scope of the invention as defined in and limited solely by the appended claims.

We claim:

1. In a system for quantitating metabolite and enzyme substrate concentrations in body fluids such as whole blood, urine, cerebrospinal fluid and the like:
   A. a support;
   B. means constituting a plurality of separate restricted test zone areas in a rigid array mounted on said support;
   C. at least one of said areas including as a stacked array a plurality of superposed test reagent impregnated members in a rigidly confined column which is adapted for placement of a fluid test media thereon, said stacked array including in descending sequence:
      i. a porous upper glass fiber disc;
      ii. a porous lower glass fiber disc;
      iii. a membrane filter disc;
      iv. a porous glass fiber filter disc; and
      v. a transparent membrane;
   D. said upper and lower glass fiber discs constituting filters to remove amorphous matter including white blood cells and to partially remove red blood cells to prevent such matter from subsequently clogging pores of said membrane filter disc;
   E. said upper and lower glass fiber discs constituting dried reagent storage reservoirs for elution therefrom by clear filtrate passing therethrough;
   F. said membrane filter disc constituting a unit for removal of red blood cells, platelets, soluble proteins and remaining particles from a test specimen;
   G. said upper and lower porous glass fiber discs and said porous glass fiber filter disc constituting fluid volume control units and said porous glass fiber filter disc additionally functioning to assist in drawing liquid through said membrane filter disc and to distribute reacting liquid consisting of the eluted filtrate and reagents across said transparent membrane which constitutes a viewing window;
   H. said support including:
      i. upper and lower slides;
      ii. said slides mounting therebetween said stacked array; and
      iii. means securing said slides together in fixed relationship.

2. In a system for quantitating metabolite and enzyme substrate concentrations in body fluids such as whole blood, urine, cerebrospinal fluid and the like:
   A. a support;
   B. means constituting a plurality of separate restricted test zone areas in a rigid array mounted on said support;
   C. at least one of said areas including as a stacked array a plurality of superposed test reagent impregnated members in a rigidly confined column which is adapted for placement of a fluid test media thereon, said stacked array including in descending sequence:
      i. a porous upper glass fiber disc;
      ii. a porous lower glass fiber disc;
      iii. a membrane filter disc;
      iv. a porous glass fiber filter disc; and
      v. a transparent membrane;
   D. said upper and lower glass fiber discs constituting filters to remove amorphous matter including white blood cells and to partially remove red blood cells to prevent such matter from subsequently clogging pores of said membrane filter disc;
   E. said upper and lower glass fiber discs constituting dried reagent storage reservoirs for elution therefrom by clear filtrate passing therethrough;
   F. said membrane filter disc constituting a unit for removal of red blood cells, platelets, soluble proteins and remaining particles from a test specimen;
   G. said upper and lower porous glass fiber discs and said porous glass fiber filter disc constituting fluid volume control units and said porous glass fiber filter disc additionally functioning to assist in drawing liquid through said membrane filter disc and to distribute reacting liquid consisting of the eluted filtrate and reagents across said transparent membrane which constitutes a viewing window;
   H. said support including:
      i. upper and lower slides;
      ii. a top retaining ring mounted on the top of said upper slide;
      iii. a lower retaining ring mounted on the top of said lower slide;
      iv. the stacked array mounted between said upper and lower retaining rings;
      v. means securing together corners of said slides; and
      vi. spring clamps operatively engaged over and covering the edges of said slides for maintaining effective contact among the members constituting the stacked array confined between said retaining rings.

3. In a system as claimed in claim 2, calibrated and shaded color test comparison means associated with the rigid array for visual comparison with color developed in a test zone area.

4. In a system as claimed in claim 3, said comparison means including a movable color shaded slide and a coacting calibrated scale.

5. In a system as claimed in claim 3, said comparison means including a revolvable color shaded disc and a coacting calibrated scale.

6. In a system as claimed in claim 3, said comparison means including a fixed color shaded strip and a coacting calibrated scale.

7. In a system as claimed in claim 2, said upper and lower glass fiber discs impregnated with a blood uric acid test composition comprising dry bovine serum albumin, glycine-borate buffer, uricase and the upper surface of the transparent membrane having thereon a dry deposit of O-Dianisidine Hydrochloride-Peroxidase mixture and dextran.

8. In a system as claimed in claim 2, said upper and lower glass fiber discs and said porous glass fiber filter disc impregnated with a testosterone and androsterone test composition comprising dry human serum albumin, Nicotinamide adenine dinucleotide Hydroxysteriod Dehydrogenase, N-methyl phenazonium metho sulfate and the upper surface of the transparent membrane having thereon a dry deposit of a solution of Nitro Blue tetrazolium and dextran.

9. In a system as claimed in claim 2, said discs impregnated with a galactose test composition comprising dry human serum albumin and Galactose oxidase, and a dry deposit of a solution of O-dianisidine, Peroxidase and Dextran on the upper surface of the transparent membrane.

10. In a system as claimed in claim 2, said discs for cholesterol screening including on the upper and lower glass fiber discs dry serum albumin, a dry deposit of an enzyme solution containing B-glucuronidase in acetate buffer, and the porous glass fiber filter disc being impregnated with a dry deposit of a substrate solution containing phenolphthalein glucuronide in acetate buffer and the upper surface of the transparent membrane having thereon a precipitated base reactible to obtain anionic red color from released phenolphthalein.

11. In a system as claimed in claim 2, said glass fiber filter disc having a freeze dried deposit of a first selected reagent thereon and said upper and lower glass fiber discs each having a freeze dried deposit of a second selected reagent required for a given test impregnated thereon.

* * * * *